United States Patent [19]

Kelly, Jr.

[11] 4,242,146
[45] Dec. 30, 1980

[54] METHOD FOR TREATING OIL-CONTAMINATED DRILL CUTTINGS

[75] Inventor: John Kelly, Jr., Arlington, Tex.

[73] Assignee: Mobil Oil Corporation, New York City, N.Y.

[21] Appl. No.: 1,564

[22] Filed: Jan. 8, 1979

[51] Int. Cl.³ .................................................. B08B 7/04
[52] U.S. Cl. ........................................ 134/7; 134/18; 134/40; 134/25.1; 175/66; 175/206; 175/207
[58] Field of Search ............... 134/7, 18, 25 R, 40; 175/66, 206, 207, 208

[56] References Cited

U.S. PATENT DOCUMENTS

| | | | |
|---|---|---|---|
| 2,464,204 | 3/1949 | Baker | 134/7 X |
| 2,601,862 | 7/1952 | Thomson | 134/7 |
| 2,919,898 | 1/1960 | Marwil et al. | 175/66 |
| 3,688,781 | 9/1972 | Talley | 175/208 X |
| 3,693,733 | 9/1972 | Teague | 175/66 |
| 4,066,539 | 1/1978 | Hachisu et al. | 134/7 X |

Primary Examiner—Marc L. Caroff
Attorney, Agent, or Firm—C. A. Huggett; Drude Faulconer

[57] ABSTRACT

A method for treating oil-contaminated drill cuttings at an onsite location, e.g. offshore drillsite, whereby the cuttings can be disposed of directly without the risk of pollution. The contaminated cuttings are separated from the drilling mud and are mixed with a solid oil absorbent material which absorbs the free oil from the contaminated cuttings. A surfactant may be added to aid in binding the oil in the cuttings and the oil absorbent material. Where the cuttings are of large size, they are preferably ground before mixing them with the oil absorbent material. Further, where the mixture of cuttings may include small or dust-like particles, the mixture is compacted into pellets, briquettes or other masses having a sufficient density to sink in water.

8 Claims, 3 Drawing Figures

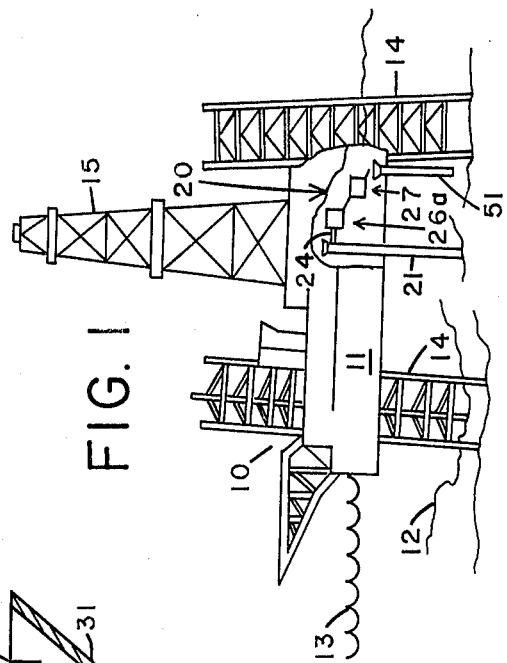
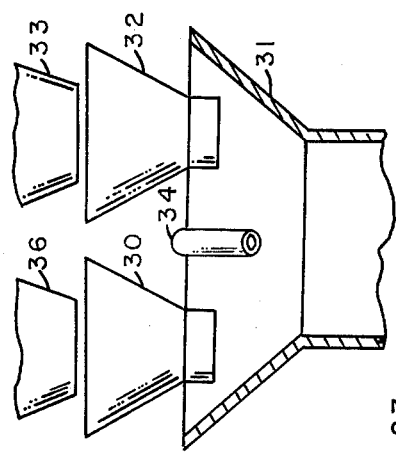
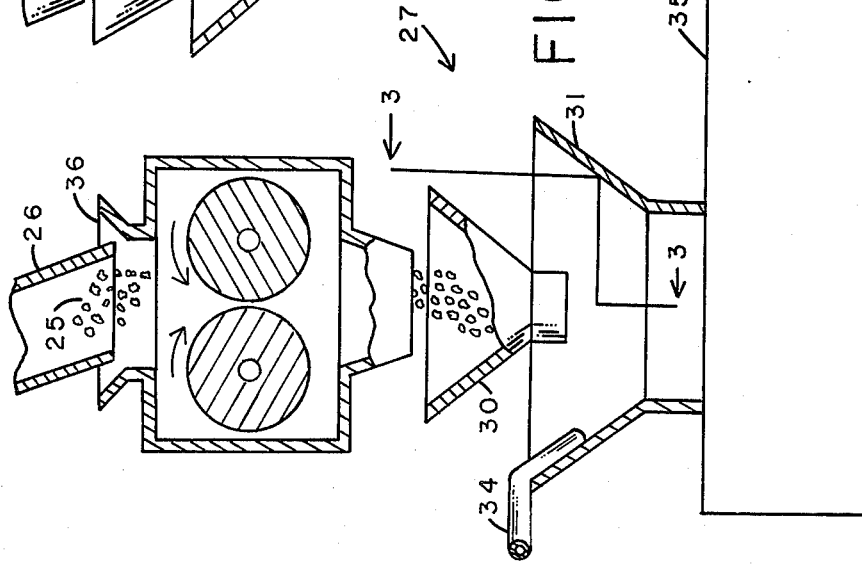

METHOD FOR TREATING OIL-CONTAMINATED DRILL CUTTINGS

BACKGROUND OF THE INVENTION

The present invention relates to an onsite method for treating contaminated drill cuttings before disposal and more particularly relates to a method for treating oil-contaminated drill cuttings at a solid offshore location so that the treated cuttings can be disposed of without ecological risk.

In a rotary drilling operation, a fluid commonly called "mud" is circulated from a storage area on the surface, downward through the drill pipe, out openings in the drill bit, and upward within the borehole to the surface. This return mud carries with it the drill cuttings from the bottom of the borehole. The returning mud along with its entrained drill cuttings is passed onto a "shale shaker" before it is returned to the storage area. The shaker which normally sits above the mud storage area is essentially a screen that is used to separate the drill cuttings and cavings from the mud. The mud falls by gravity through the screen and the cuttings pass over the end of the screen.

Disposal of these separated cuttings is sometimes a real problem, e.g. where the drilling operations are carried out at an offshore location. In some instances, the cuttings are merely passed from the shaker into the body of water and are allowed to settle to the bottom. However, as is often the case, when a drilling mud system such as an oil-base mud is used, the cuttings are usually coated with undesirable contaminants, e.g. oil. If these contaminated cuttings are disposed of directly into the water, there is a risk that free oil on the cuttings may wash off the cuttings and accumulate on the surface of the water. Due to this possible pollution threat, unless the cuttings can be ecologically disposed of, governmental regulations may prevent the use of oil-base muds in some drilling operations where the use of such muds is highly beneficial, if not mandatory.

There are at least two known general techniques for treating these contaminated cuttings to make them ecologically acceptable. Either they must be hauled or barged to disposal facilities on shore or they must be treated on site to remove the contaminants before they are disposed of in the water. The added expense involved in hauling the cuttings ashore is substantial, and, accordingly, seriously detracts from widespread commercial application of this technique. Further, the technique of hauling of the cuttings to shore for disposal may be impractical in areas of bad weather and rough seas. Therefore, for obvious reasons, it is much preferred to treat and dispose of the drill cuttings from offshore operations directly at the drilling site.

Several methods have been proposed for treating contaminated cuttings on site. One approach is to burn oil off the cuttings with high intensity lamps. However, this approach presents problems (i.e., possible fire hazards due to the lamps and the difficulty of equally exposing all the cuttings to the lamps) which makes it unfeasible in most instances.

Another approach involved washing the cuttings with a detergent to remove the contaminants, separating the washing solution and contaminants, and dumping the cleaned cuttings into the water. One example of this approach is disclosed in U.S. Pat. No. 3,688,781, issued Sept. 5, 1972. Other wash techniques are discussed in the article "Cuttings Can Meet Offshore Environment Specifications", *OIL AND GAS JOURNAL*, Aug. 14, 1972, pp. 73–76. While such techniques may be successful in cleaning the cuttings, the handling and disposal of large volumes of wash solution and the equipment necessary for washing the cuttings detract from the overall effectiveness of this method. Therefore, a reliable method for treating oil contaminated cuttings onsite is needed to insure the oil base muds can be safely used in all instances where drilling conditions dictate their use.

SUMMARY OF THE INVENTION

The present invention provides a method for treating oil contaminated drill cuttings at an onsite location so that the treated cuttings can be disposed of without any pollution risk.

The present invention involves separating the cuttings from the drilling fluid and then thoroughly mixing the oil-contaminated cuttings with an oil absorbent material, e.g. clay. The contaminated cuttings will normally have some oil absorbed therein but will also have "free oil" on the surfaces thereof. This free oil is what presents the threat of pollution when the cuttings are disposed of directly into a body of water. The free oil on the cuttings will contact and be absorbed and held by the oil absorbent material as the mixing takes place. To aid in binding the absorbed oil onto or into both the cuttings and the oil absorbent material, a surfactant, e.g. calcium dodecylbenzene sulfonate, is added to the cuttings and oil absorbent material prior to or during mixing.

Where the cuttings are originally of a relatively large size, it is preferable to mull or grind the cuttings before mixing the cuttings with the oil absorbent material. This reduces the size of the cuttings, which aids in mixing, and also increases the surface area of the cuttings themselves which now becomes available for absorbing some of the free oil.

After the cuttings and oil absorbent material are thoroughly mixed, substantially all of the free oil will be bound by the cuttings and/or oil absorbent material in the mixture. This mixture can now be safely disposed of directly into a body of water without the risk of any significant amount of free oil being washed therefrom to pollute the environment. However, where the mixture contains extremely small or dustlike particles, these particles, theselves, may float on the water surface thereby creating an undesirable condition. In these instances, the present invention provides for compacting the mixture before disposal into pellets, briquettes, or the like which are of a sufficient density to insure that they will safely sink to the bottom of the body of water when placed therein.

BRIEF DESCRIPTION OF THE DRAWINGS

The actual construction, operation, and the apparent advantages of the invention will be better understood by referring to the drawings in which like numerals identify like parts and in which:

FIG. 1 is a perspective view, partly in section, of an offshore drilling platform incorporated the present invention;

FIG. 2 is a schematical, elevational view, partly in section, of a treating unit in accordance with the present invention; and FIG. 3 is a cross-sectional view taken along line 3—3 of FIG. 2.

DESCRIPTION OF THE PREFERRED EMBODIMENT

Referring more particularly to the drawings, a typical offshore drilling rig 10 is disclosed in FIG. 1 which has a platform 11 supported on marine bottom 12 of the body of water 13 by means of legs 14. A derrick 15 is mounted on platform 11 which is used to carry out normal rotary drilling operations. Although a fixed platform is shown for illustrative purposes, it should be realized that the present invention can be used equally as well with other offshore drilling apparatus, e.g., floating drilling vessels, submergible barge platforms, etc. or it can be used at onshore locations.

In rotary drilling operations, a fluid commonly called mud is circulated into and out of the hole being drilled for a number of reasons, one being to carry drill cuttings out of the borehole. A typical, well known mud circulation system 20 for a rotary drilling operation is partially illustrated in FIG. 1. A conductor pipe 21 extends from platform 11 into marine bottom 12. Mud is circulated down a drill string (not shown) which is positioned in and extends through conductor pipe 21. The mud exits from the drill pipe through openings in a drill bit (not shown) on the lower end of the drill pipe and flows upward through conductor pipe 21 to mud return line 24. The mud carries drill cuttings with it back to the surface. As is well known in the art, the mud exits mud return line 24 and flows through shale shakers, desanders, desilters, hydrocyclones, centrifuges, and/or other known devices (shown collectively as 26a in FIG. 1) to separate the cuttings from the mud. The mud is then returned to a storage area (not shown) for reuse.

Where the mud being used does not coat the cuttings with any undesirable contaminants, the cuttings are sometimes returned directly to the body of water 13 or are disposed of in some other manner. However, as is often the case, a special mud system has to be employed in certain drilling operations, both offshore and onshore, which coats the cuttings with contaminants. This presents serious problems in disposing of the cuttings. For example, in offshore operations, the contaminants may wash free when the cuttings are returned to the water, thereby causing undesirable pollution problems. An example of such a mud system is one commonly called "oil-base" mud system. The mud used in this system coats the cuttings with oil which remains adhered thereto even after the cuttings are mechanically separated from the mud. If these cuttings are returned untreated to the water, some of the oil most likely will wash off and may form an oil slick on the water. Also, in some instances, the cuttings, after separation, are "washed" with diesel or other suitable oil to remove whole mud and other chemical contaminants therefrom. However, some of the diesel or other oil is likely to adhere to the cuttings which complicates their disposal.

As shown in FIGS. 2 and 3, contaminated cuttings 25, after being separated from the mud and/or washed with diesel or other suitable oil, pass through holding bin 30 into inlet hopper 31 of treating unit 27. A second holding bin 32 is also positioned over inlet hopper 31 and is adapted to receive a dry, solid oil absorbent material, e.g. clay material such as attapulgite, kaolinite, montmorillonite, vermiculite, etc.) through chute 33 or the like. For simplicity, both holding bins 30, 32, as illustrated, feed directly into inlet hopper 31 of treating unit 27. However, it should be understood that separate feed means (not shown) may be used in conjunction with the holding bins to meter the cuttings and absorbent material into inlet hopper 31 at a desired controlled rate. For example, individual screw conveyors or belt conveyors can be positioned below bins 30 and 32, respectively, to receive material from their respective hopper and the move the respective material into inlet hopper 31 at a controlled rate to insure that a proper ratio between the cuttings and the oil absorbent material is maintained. Such feed arrangements are well knwon in the mixing art and the details thereof do not form a part of the present invention. For an example of such a feeding arrangement, see U.S. Pat. No. 4,116,681. A conduit 34 is provided to supply a liquid surfactant into inlet hopper 31 for a purpose to be described later.

Treating unit 27 is comprised of a mixer 35 which receives both the cuttings and the oil absorbent material from inlet hopper 31. Again, the details of mixer 35 form no part of the present invention and mixer 35 may be of any known type that is capable of adequately mixing the cuttings and oil absorbent material into a uniformly dispersed mixture. Examples of such mixers are Readco's Continuous Processor, sold by Readco of York, Pa., and Twin Screw Continuous Mixer, Model MPCV-160, sold by Baker-Perkins, Inc. of Houston, Texas.

In some instances where the cuttings include relatively large cuttings, a muller or grinder 36 may be positioned between chute 26 and holding bin 30 to mull the cuttings before mixing for a purpose to be discussed later.

The cuttings and oil absorbent material are thoroughly mixed in mixer 35 and are fed to a compactor means 38 through conduit 37. Compactor means 38 can be of any known type which compacts the mixture of cuttings and oil absorbent material into a solid form, e.g. any of many known, commercially available "pelletizers" which compact a solid mixture and extrude the mixture as pellets or briquettes, e.g. K-G Briquetting System sold by Komarek-Greaves and Co., Rosemont, Ill. The pellitized mixture 40 is conveyed from compactor means 38 to chute 51 through conduit 41. Chute 51 conveys pelletized mixture 40 to a disposal area, e.g. water 13, as shown in FIG. 1. While apparatus capable of carrying out the present method has been described above, (also see U.S. Pat. No. 4,116,681 for similar apparatus) a more detailed description of the present method will now be set forth.

Cuttings are separated from the drilling mud by processing equipment 26a. The cuttings may be washed with diesel or the other oil to remove "whole mud" and other chemical contaminants that may be present on the cuttings. The oil-contaiminated cuttings 25 are then passed through chute 26 into holding bin 30 from where they are fed into inlet hopper 31 of treating unit 27. At the same time, a dry, solid oil absorbent material is fed from bin 32 into inlet hopper 31. For a particular operation, the rates at which the cuttings and the oil absorbent material, respectively, are fed into inlet hopper 31 will be determined experimentally based on the amount of oil present on the cuttings, the absorbency of the oil absorbent material, etc. Preferably, an excess of oil absorbent material will be supplied to inlet hopper 31 to insure that all of the free oil present on the cuttings will be absorbed.

As is known in the art, most oil-base mud systems utilize a surfactant in the mud to make the solids oil wet. By doing so, oil is chemically absorbed on the surfaces of the solids and prevents the solids from becoming water wet. The oil which is thus chemically absorbed is not removed or displaced when the oil wet solids are placed in water. In many operations, there will be a substantial amount of this surfactant present on the contaminated cuttings 25 along with the oil. The surfactant acts to make the cuttings oil-wettable thereby chemically binding much of the oil to the cuttings. Where no or insufficient surfactant is present on the cuttings, a surfactant capable of making the surfaces of the solids oil wettable, e.g. calcium dedecylbenzene sulfonate, is added to the cuttings and oil absorbent material through conduit 34. In some instances, the oil absorbent material may be pretreated to include the surfactant before mixing.

The cuttings, oil absorbent material, and surfactant are thoroughly mixed in mixer 35. All free oil on the cuttings will be absorbed by the oil absorbent material, and the surfactant either present or added will aid in chemically binding the oil in the cuttings and in the oil absorbent material. As mentioned above, if the cuttings are relatively large, it is preferred that the cuttings be mulled or ground before they are finally mixed with the oil absorbent material. This exposes additional absorbent surface area on the cuttings which will also be available for the absorption of free oil, and the smaller cutting size also provides for better mixing with the oil absorbent material.

After the mixture exits mixer 35, substantially all of oil will be adequately bound in the mixture so that no significant amount of oil, if any, will wash free once the mixture is disposed of in a body of water. However, if the mixture contains extremely small or dust-like particles, these particles, themselves, may float on the water and cause an undesirable condition around an offshore location. In these instances, the mixture from mixer 35 is fed to compactor means 38 wherein the mixture is compacted into pellets 40, briquettes, or the like, which are of sufficient density to insure they will sink in the water.

As can be seen from above, the present invention provides, a safe, reliable method for the onsite treatment of oil-contaminated drill cuttings to be disposed of without the risk of pollution.

What is claimed is:

1. A method of treating oil-contaminated drill cuttings from a well drilling operation in which a drilling fluid is circulated to remove drill cuttings from the well being drilled, said method comprising:
   separating said cuttings from said drilling fluid;
   mixing a solid, oil absorbent material with said separated cuttings to absorb free oil from the cuttings into said oil absorbent material;
   compacting said cuttings and said oil absorbent material after mixing; and
   disposing of said cuttings and said solid, oil absorbent material after they are compacted.

2. The method of claim 1 wherein said oil absorbent material comprises:
   clay.

3. The method of claim 1 including:
   adding a surfactant to said cuttings before mixing said cuttings with said solid, oil absorbent material, said surfactant capable of making the surfaces of said cuttings oil wettable to thereby aid in binding said free oil in said cuttings and said solid, oil absorbent material.

4. The method of claim 1 wherein said compacting step includes:
   forming said compacted cuttings and oil absorbent material into individual masses having a sufficient density to sink in water.

5. The method of claim 1 including:
   grinding said cuttings before mixing said cuttings with said oil absorbent material.

6. The method of claim 3 wherein said compacting step includes:
   forming said compacted cuttings and oil absorbent material into individual masses having a sufficient density to sink in water.

7. The method of claim 6 including:
   grinding said cuttings before mixing said cuttings with said oil absorbent material.

8. The method of claim 7 wherein said oil absorbent material comprises:
   clay.

* * * * *

UNITED STATES PATENT AND TRADEMARK OFFICE
CERTIFICATE OF CORRECTION

PATENT NO. : 4,242,146
DATED : December 30, 1980
INVENTOR(S) : John Kelly, Jr.

It is certified that error appears in the above-identified patent and that said Letters Patent are hereby corrected as shown below:

Column 1 line 9, delete "a solid" and insert -- an --.

Column 2 line 48, delete "theselves" and insert -- themselves --.

Column 5 line 11, delete "dedecylbenzene" and insert
-- dodecylbenzene --.

Signed and Sealed this

Twelfth Day of May 1981

[SEAL]

Attest:

RENE D. TEGTMEYER

Attesting Officer     Acting Commissioner of Patents and Trademarks